US009900347B2

(12) United States Patent
Lindholm et al.

(10) Patent No.: US 9,900,347 B2
(45) Date of Patent: Feb. 20, 2018

(54) HANDLING TRUST IN AN IP MULTIMEDIA SUBSYSTEM COMMUNICATION NETWORK

(75) Inventors: Fredrik Lindholm, Älvsjö (SE); Peter Hedman, Helsingborg (SE); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 3030 days.

(21) Appl. No.: 11/898,718

(22) Filed: Sep. 14, 2007

(65) Prior Publication Data
US 2009/0077616 A1 Mar. 19, 2009

(51) Int. Cl.
H04L 29/06 (2006.01)

(52) U.S. Cl.
CPC .......... H04L 63/20 (2013.01); H04L 65/1006 (2013.01); H04L 65/1016 (2013.01); H04L 65/1079 (2013.01)

(58) Field of Classification Search
CPC . H04L 63/20; H04L 65/1016; H04L 65/1079; H04L 65/1006
USPC ............................................................ 726/1
See application file for complete search history.

(56) References Cited

U.S. PATENT DOCUMENTS

| 7,370,050 | B2* | 5/2008 | Hunter | G06F 21/6227 |
| 7,814,075 | B2* | 10/2010 | Sack | G06F 21/6227 707/694 |
| 7,962,513 | B1* | 6/2011 | Boles | H04L 63/20 707/781 |
| 8,239,915 | B1* | 8/2012 | Satish | G06F 21/00 713/166 |
| 2002/0052200 | A1* | 5/2002 | Arkko | H04L 63/062 455/432.1 |
| 2006/0050889 | A1* | 3/2006 | Lee | H04L 9/0637 380/286 |
| 2006/0168018 | A1* | 7/2006 | Levin et al. | 709/206 |
| 2006/0168021 | A1* | 7/2006 | Levin et al. | 709/206 |
| 2006/0168022 | A1* | 7/2006 | Levin et al. | 709/206 |
| 2006/0230279 | A1* | 10/2006 | Morris | 713/182 |
| 2007/0099620 | A1* | 5/2007 | Patterson | H04M 1/57 455/445 |
| 2007/0113086 | A1 | 5/2007 | Huang et al. | |
| 2007/0121596 | A1* | 5/2007 | Kurapati et al. | 370/356 |
| 2007/0124813 | A1* | 5/2007 | Ormazabal | H04L 12/2697 726/11 |

(Continued)

FOREIGN PATENT DOCUMENTS

EP 1649389 A1 * 4/2006 ......... H04L 45/7453
JP 2006050407 A 2/2006

(Continued)

OTHER PUBLICATIONS

International Search Report and Written Opinion, dated Sep. 18, 2008, corresponding Application No. PCT/EP2007/059680.

(Continued)

Primary Examiner — John B King

(57) ABSTRACT

A method and apparatus for handling trust in an IP Multimedia Subsystem network. A node in the IP Multimedia Subsystem network receives a Session Initiation Protocol message from a remote node. The message includes an indicator indicating the level of trust of a communication sent from the remote node to the IP Multimedia Subsystem node. The node can then apply a security policy to the message, the security policy being determined by the indicator.

14 Claims, 7 Drawing Sheets

(56) References Cited

U.S. PATENT DOCUMENTS

| | | |
|---|---|---|
| 2007/0186101 A1* | 8/2007 | Rajko et al. ............... 713/161 |
| 2008/0022389 A1* | 1/2008 | Calcev et al. ............... 726/14 |
| 2009/0165116 A1* | 6/2009 | Morris ............... 726/14 |

FOREIGN PATENT DOCUMENTS

| | | | |
|---|---|---|---|
| WO | 2004071104 A2 | 8/2004 | |
| WO | WO 2005010777 A1 * | 2/2005 | ......... H04L 45/7453 |

OTHER PUBLICATIONS

Jennings et al., Private Extensions to the Session Initiation Protocol (SIP) for Asserted Identity within Trusted Networks, rfc3325.txt, Internet Engineering Task Force, XP015009093, Nov. 1, 2002, pp. 1-18.

3GPP TS 24.99 v7.8.0, IP Multimedia Call Control Protocol and Session Description Protocol Stage 3 (Release 7), Jun. 2007.

ETSI TS 133 210 v7.2.0, Digital Cellular Telecommunications System (Phase 2+), (3GPP TS 33.210 version 7.2.0 Release 7), Dec. 2006.

English translation of Chinese Official Action dated Jul. 3, 2012 in Chinese Application No. 200780100638.

* cited by examiner

HANDLING TRUST IN AN IP MULTIMEDIA SUBSYSTEM COMMUNICATION NETWORK

TECHNICAL FIELD

The technology described in this application relates to the field of handling trust in an IP Multimedia Subsystem Communication Network.

BACKGROUND

IP Multimedia services provide a dynamic combination of voice, video, messaging, data, etc. within the same session. By growing the number of basic applications and the media that it is possible to combine, the number of services offered to the end users will grow, and the inter-personal communication experience will be enriched. This will lead to a new generation of personalised, rich multimedia communication services.

IP Multimedia Subsystem (IMS) is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Releases 5 to 8). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The integration of an IP Multimedia Subsystem into a 3G mobile communications system is illustrated schematically in FIG. 1.

IMS Authentication and Key Agreement (AKA) is used to establish shared keys between a User Equipment (UE) 101 such as a mobile telephone, and a Proxy-Call Session Control Function (P-CSCF) 102 in an IMS network 103. This allows signals sent between the UE 101 and the IMS network 103 to be securely encrypted by using an IP-sec tunnel with pre-shared keys. The P-CSCF 101 may be located either in a Visited Public Land Mobile Network (PLMN), as illustrated in FIG. 2, or in a Home PLMN, as illustrated in FIG. 3. The Home PLMN 201 is a network in which a UE 202 is registered, and the Visited PLMN 203 is a network to which the UE 202 may be attached. A Serving-Session Control Function (S-CSCF) 204 is located in the Home PLMN 201, and controls authentication and authorization of the UE 202 when the UE joins the network, see, for example, TS 33.203.

It is envisaged that IMS will not only apply to 3GPP IMS networks but to non-3GPP IMS networks such as Telecoms & Internet converged Services & Protocols for Advanced Networks (ETSI TISPAN) and PacketCable, see, for example ETSI ES 282 007 and PKT-SP-23.228-I02-061013. However, TISPAN and PacketCable deployments of IMS do not only use IMS AKA, as used by 3GPP IMS networks. Authorising a Universal Subscriber Identity Module (USIM) or an IP Multimedia Services Identity Module (ISIM) in a TISPAN or PacketCable terminal to access a 3GPP IMS network is, in certain scenarios, an obstacle for these access technologies. TISPAN and PacketCable have introduced other security solutions as HTTP Digest for SIP, Network Attachment Subsystem (NASS)-IMS bundled authentication, and Transport Layer Security (TLS). However, these security mechanisms offer a lower level of security that IMS AKA.

It is desirable for 3GPP IMS networks to be capable of inter-working with TISPAN and PacketCable networks, to improve the options available to users of the networks. In order to allow this, the S-CSCF in an IMS network must be able to handle and support inter-working between different access technologies. This would allow terminals using different access technologies to communicate with each other.

In addition to IMS networks being accessible using different access technologies, such as 3GPP, TISPAN, and PacketCable, IMS networks may also be accessible using interconnect technologies such as PSTN inter connect (see, for example, 3GPP TS 23.002), IMS interconnect (see, for example, 3GPP TS 23.228), and Internet Interconnect. Note that: Internet Interconnect is not a specified protocol or system, and tends to be based on proprietary implementations. These allow terminals accessing a non-IMS network to access IMS services from an IMS network.

The different types of network and access technologies expose an IMS network to signalling from terminals or network nodes from different networks, that may have different trust levels to other nodes within the same IMS network. This is a particular problem for IMS interconnect, as it is not possible for an interconnecting network to have any knowledge about different trust levels used in another network with which it is interconnected. The interconnecting network will therefore treat all incoming traffic equally.

In current IMS networks, there is only one trust domain accorded to signalling, and so a message is either trusted or it is not trusted. If a SIP Request used to establish a session is not trusted, then an asserted user identity, P-Asserted-Id (see RFC3325), contained in the SIP Request is removed from the SIP Request before being forwarded to the non-trusted domain. The IMS network operator must either accept the lower level of security used e.g. early IMS security (see TR33.978) or HTTP Digest (see RFC2617), or not accept it and remove any asserted information from the request.

IMS provides very strong security, but as interoperability with other access technologies and networks increases then the security applied to IMS communications may be lowered. This leads to an increased risk of unsolicited communications to each IMS user, which is unsatisfactory. It can also reduce the likelihood of IMS being adopted for services requiring a strong security architecture, such as IPTV where media streams may be encrypted to individual users or groups of users.

SUMMARY

The inventors have realised the problems associated with the trust levels in current IMS networks, and have devised a solution to indicate to nodes in an IMS network the level of trust that should be accorded to signalling. The SIP protocol is extended by including additional information in SIP messages, the additional information relating to a level of trust of the message. This allows for flexible handling of trust in IMS sessions between networks. Information elements may be added, verified, and enforced by different entities in the network.

According to a first aspect, there is provided a method of handling trust in an IP Multimedia Subsystem network. A node in the IP Multimedia Subsystem network receives a Session Initiation Protocol message from a remote node. The message includes an indicator indicating the level of trust of a communication sent from the remote node to the IP Multimedia Subsystem node. On the basis of the indicator, the node applies a security policy to the message.

This has the advantage that a node can take a decision on how much trust to accord the message. This may be particularly advantageous when the remote node is disposed in another network, which may not be an IMS network.

SIP messages are normally used to set up communications sessions, and so as an option, the security policy is applied to all signalling, such as media, associated with the Session Initiation Protocol message.

The indicator, as an option, is a number, in which case the number can be mapped directly to a security policy. Alternatively, the indicator is a description, in which case the description is mapped to a security policy.

The indicator comprises as an option a plurality of indicator elements, each indicator element relating to a level of trust of a different node in a signalling path between the remote node and the node. This allows a trust level indicator to be built up as a SIP message traverses different nodes along a path to its destination, and trust information relating to the traversed nodes can be included in the trust level indicator. An indicator element may comprise an indication of a network from which the SIP message was received.

A trust level indicator is optionally derived from any information that could have a bearing on the trust level that should be accorded the message. Such information includes user terminal type, encryption type, network type, node type, end user authentication mechanism, and intra-domain security mechanism.

As an option, the applied security policy is selected from any of removing a P-Asserted Identity header, applying topology hiding, disallowing the communication, allowing the communication with no modification, filtering the message in accordance with a database of allowable message sources, and applying malware detection on incoming signalling relating to the SIP message.

The security policy is optionally applied at any node where it is relevant to apply such a policy. Such nodes include a border element, an Application Server, User Equipment, and a Call Session Control Function.

According to a second aspect, there is provided a node for use in an IP Multimedia subsystem network. The node includes a receiver for receiving a Session Initiation Protocol message from a remote node. The message includes an indicator indicating the level of trust of a communication sent from the remote node to the node. The node further comprises a processor for applying a security policy to the message. The security policy is determined from information contained in the indicator.

Such a node is used to apply a security policy to a message on the basis of the information contained in the indicator. This has the advantage of allowing flexible application of security policies to messages depending on the level of trust that the node accords the message.

The node is optionally selected from one of User Equipment, a Call Session Control Function, a border element, and an Application Server.

According to a third aspect, there is provided a node for use in a communications network. The node comprises means for collecting trust level information, and a processor for generating a trust level indicator on the basis of the trust level information. The processor is also for modifying a Session Initiation Protocol message such that the Session Initiation Protocol message includes the trust level indicator. The node further comprises a transmitter for sending the Session Initiation Protocol message.

Such a node has the advantage of allowing a SIP message containing a trust level indicator to be sent. As described above, the trust level indicator can be used to determine a security policy that is applied to the message, and allows flexibility in applying different security policies to messages depending on the degree of trust accorded to the message by the network.

The processor is preferably arranged to modify an existing trust level indicator in a SIP message by adding a trust level indicator element to the existing trust level indicator, the trust level indicator element relating to a trust level of the node or a network in which the node is disposed.

The node is preferably selected from one of User Equipment, a Call Session Control Function, border element, and an Application Server.

According to a fourth aspect, there is provided a method of handling trust in an IP Multimedia Subsystem network. Trust level information is collected at a network node, and a trust level indicator is created on the basis of the trust level information. The trust level indicator is then added to a Session Initiation Protocol message.

The advantage of creating or modifying a SIP message to include a trust level indicator is that other nodes can, on the basis of the trust level indicator, determine how much trust should be accorded to a SIP message or associated message, and provides flexibility in the types of security policy that can be applied to the message.

The trust level indicator is, as an option, either added to a new Session Initiation Protocol message created by the network node, or added to an existing Session Initiation Protocol received by the network node.

The trust level information is optionally based on any of database information, user terminal type, encryption type, network type, node type, end user authentication mechanism, and intra-domain security mechanism.

DETAILED DESCRIPTION

Figure 1:
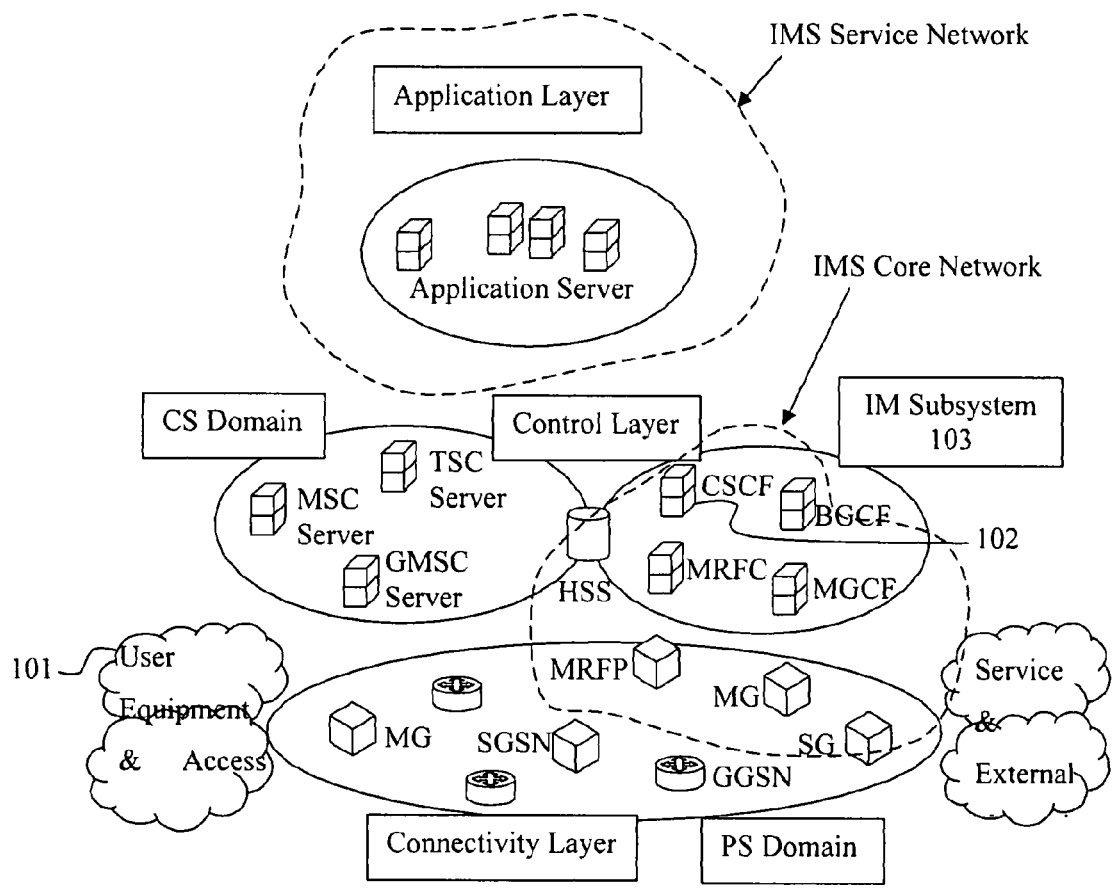
FIG. 1 illustrates schematically in a block diagram an integration of an IP Multimedia Subsystem into a 3G mobile communications system.
Figure 2:
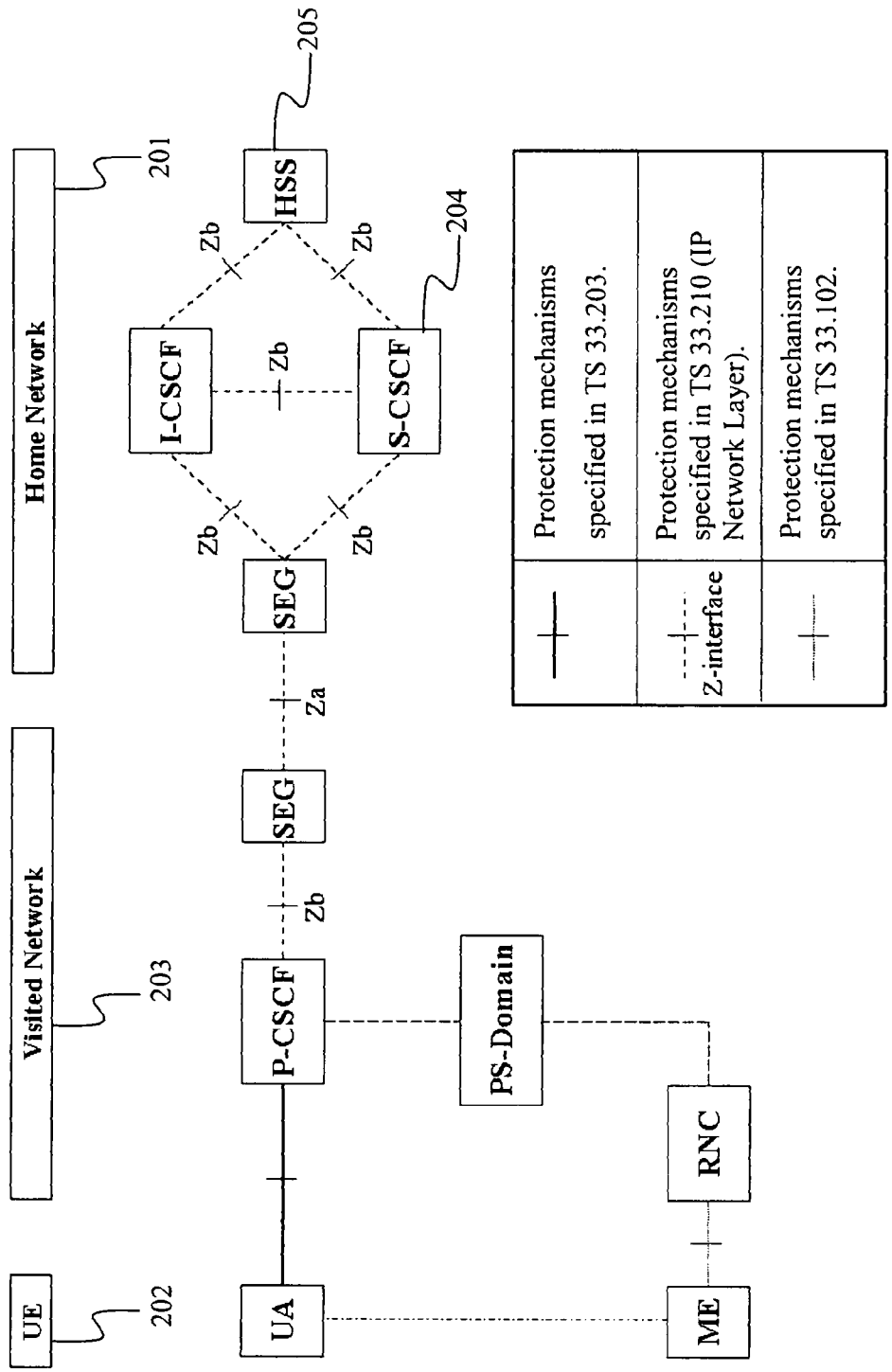
FIG. 2 illustrates schematically in a block diagram a security architecture for an IMS network when a P-CSCF is disposed in a Visited Network.
Figure 3:
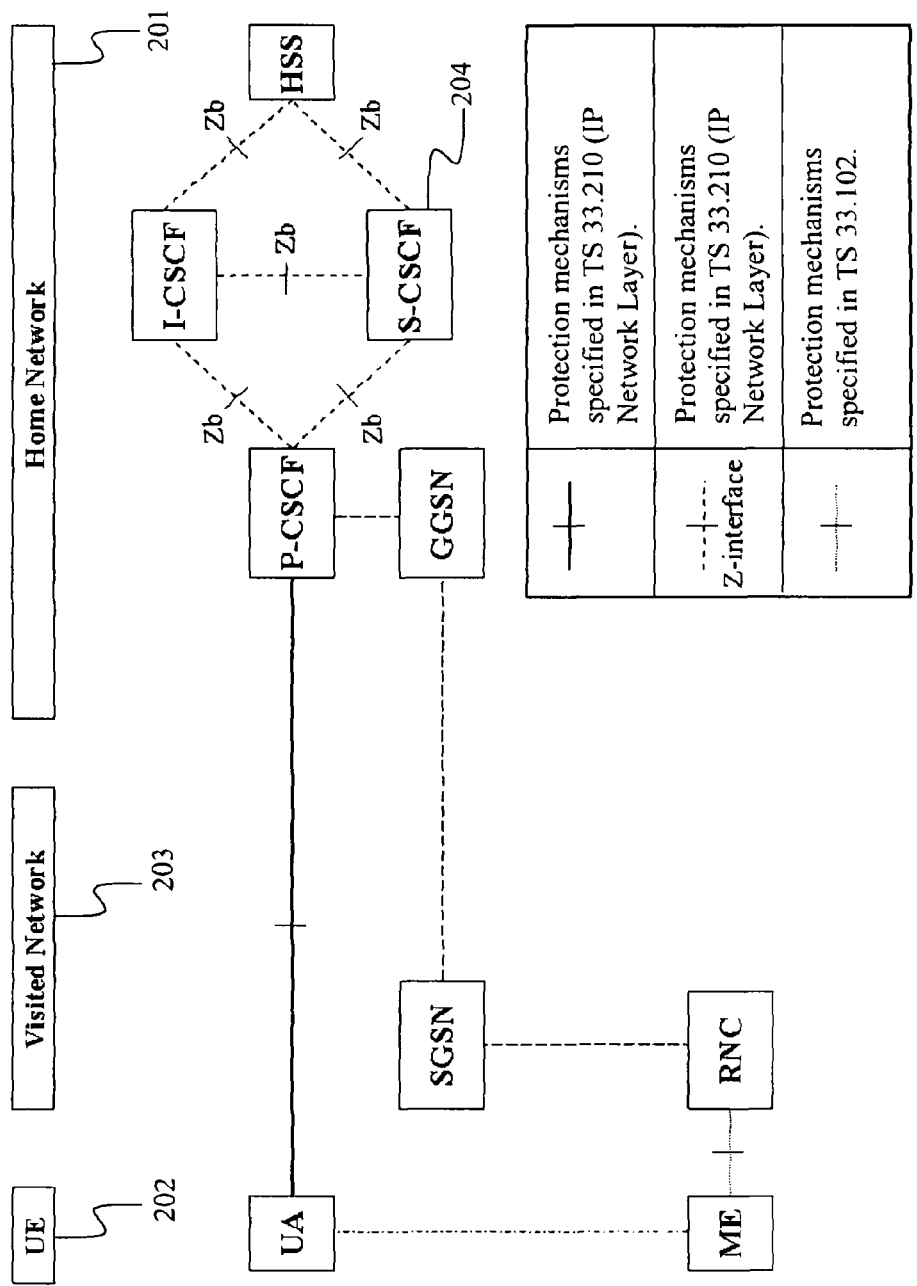
FIG. 3 illustrates schematically in a block diagram a security architecture for an IMS network when a P-CSCF is disposed in a Home Network.

By introducing an indication of the level of trust into signalling, a node in an IMS network can ascertain what level of trust is accorded to signalling from a remote node such as User Equipment (UE). The level of trust may depend upon various factors, such as the security at the UE, and the security at different nodes in the transmission path from the UE to the node in the IMS network.

There are several ways that an indication of trust can be made. A first way to indicate trust is numerical; for example, a new trust level could lie within a certain range such as 1 to 10, where an indicated trust level of 10 is allocated to an access technology or security mechanism which is fully trusted, and an indicated trust level of 1 is allocated to an access technology which is not trusted by the IMS node receiving the signalling.

An IMS network operator can categorize different terminals supporting different access technologies and security mechanisms with the level of trust. Table 1 is an example of trust level accorded to different access technologies and security mechanisms.

TABLE 1

| Terminal | Trust Level |
| --- | --- |
| TrustInfo = Authentication: IMS AKA, Confidentiality: AES-CBC-128, Integrity: HMAC-SHA1, Intra-domain Sec: NDS, Terminal sec: Sony-Ericsson K800i, Interconnect NW: TrustedOperator | 10 |
| TrustInfo = Authentication: 3GPP Early IMS, Confidentiality: radio, Integrity: radio, Intra-domain Sec: Physical, Terminal sec: Sony-Ericsson K800i, Interconnect NW: TrustedOperator | 6 |
| TrustInfo = Authentication: HTTP Digest, Confidentiality: TLS-AES-CBC-128, Integrity: TLS-HMAC-SHA1-160, Intra-domain Sec: Physical, Terminal sec: Residential GW | 5 |
| TrustInfo = Authentication: HTTP Digest, Confidentiality: None, Integrity: None, Intra-domain Sec: Physical, Terminal sec: PC | 2 |

With the numerical example described above, the trust level indicator is simply a numeral. However, different IMS network operators may have different views on how much trust can be accorded to a given access technology or security mechanism, depending on their own security policies and risk assessments. In this case, the trust indicator is descriptive rather than numerical. The trust indicator comprises a description of factors that may affect the level of trust that should be accorded to a message. The description is standardized, and can be mapped by each network operator to a trust level that that network operator perceives is correct. Accordingly, signalling having exactly a given descriptive trust level indicator may be accorded different levels of trust by different IMS network operators, but the trust level indicator is standardized so that each network operator can take there own view on the level of trust to be accorded.

The following elements may be included in signalling as part of the descriptive trust level indicator:
  End user network access security mechanism applied (if available)
  End user IMS authentication mechanism used
  Message Integrity protection used for access security
  Message Confidentiality protection used for access security
  Intra domain security mechanism applied.

Furthermore, it might also be beneficial for the signalling sent to the IMS network to also include the following information, if it is available:
  Terminal type, i.e. what type of hardware and software is used, and whether this can be certified or not.
  Media security level, i.e. an indication of whether any specific media security mechanisms are applied by the network(s)
  Indication of whether the signalling includes a network-generated request from a trusted AS or GW. This is useful for "out of the blue" calls, where it is the network that generates the request on behalf of a user.
  Interconnect networks. This includes the identity of the network(s) that the signalling originates from, or has traversed before entering the terminating network. This is used particularly when an operator has an agreement with a less reliable network than the operator's own, e.g., pure Internet telephony, which has no strong user authentication, PSTN networks etc.

Figure 4A:
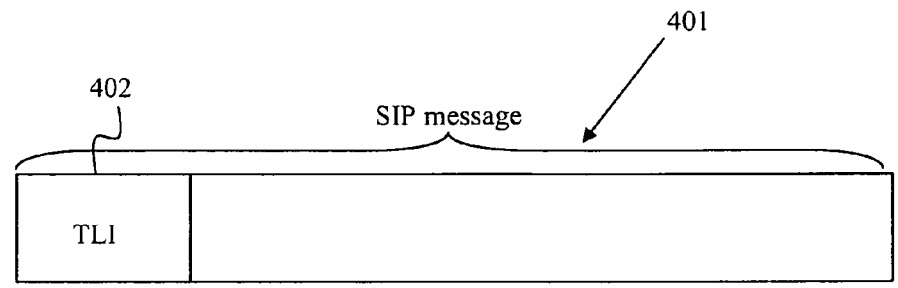
FIG. 4A illustrates schematically an example of a message that includes a trust level indicator.

As IMS sessions are established using SIP signalling, it is beneficial to include the trust level indicator in the SIP signalling used to establish a session, rather than sending separate signalling to provide trust information. Referring to FIG. 4A, there is illustrated schematically an example of a SIP message 401, that has a trust level indicator 402 as part of the message.

The following is an example of a SIP message including a trust level indicator:
  INVITE sip:peter@company.com SIP/2.0
  Via: SIP/2.0/UDP pc1.company.com; branch=sdher4ty56df
  Max-Forwards: 40
  To: Peter <sip:peter@company.com>
  From: Monica <sip:monica@company.com>; tag=123456789
  Call-ID: 762947fed38
  TrustInfo: Authentication=HTTP Digest: Confidentiality=TLS-AES-CBC-128; Integrity=TLS-HMAC-SHA1-160;
  Contact: <sip:monica@pc1.company.com>
  Content-Type: application/sdp
  Content-Length: 167
  <SDP contect . . . >

Figure 4B:
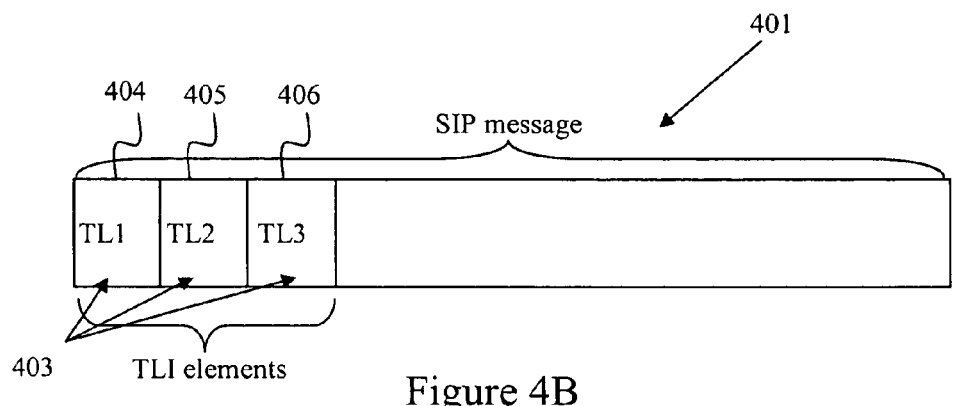
FIG. 4B illustrates schematically an example of a message that includes a trust level indicator made up of trust level indicator elements.

The trust level indicator need not be a single indicator for the signalling. A trust level indicator may be made up of trust level indicator elements, which determined and added to the trust level indicator by different nodes as the SIP message traverses those nodes to its destination in the IMS network. As shown in FIG. 4B, a trust level indicator 403 may be added to by a P-CSCF including a trust level indicator element TL1 404 describing what type of Confidentiality and Integrity protection is used. A S-CSCF may add a trust level indictor element TL2 405 describing the authentication mechanism that has been successfully applied. Interconnect functions may add a trust level indictor element TL3 406 identifying the network from which the SIP message was received. In this way, the trust level indicator 403 is built up as the SIP message 401 traverses different nodes before terminating in the IMS network network.

Figure 5:
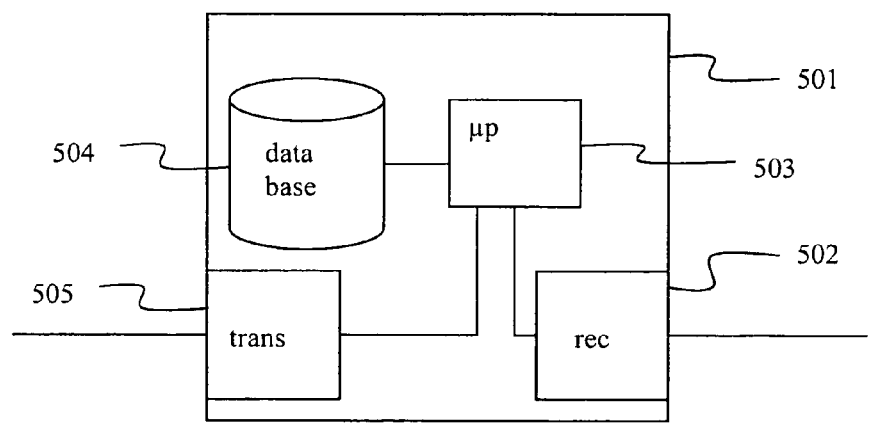
FIG. 5 illustrates schematically in a block diagram a node for use in a communications network according to an example embodiment.

Referring to FIG. 5 herein, there is illustrated schematically a node for use in a communications network according to an example embodiment. The node 501 comprises a receiver 502, for receiving SIP messages a processor 503 for analysing a received SIP message and modifying it to include a trust level indicator. The processor may access a database 504 to obtain information to include in the trust level indicator. This database may be located remotely or may be disposed within the node. The information for the trust level indicator may also be received from other collected sources not shown in FIG. 5. The database 504 may also include a mapping database that maps a trust level indicator to a security policy to be applied in the event that the SIP message contains a given trust level indicator. For cases where the message does not terminate at the node, the node 501 further comprises a transmitter 505 for forwarding the modified SIP message. The functions of the node may be at any or all nodes that handle the message, including User Equipment, Application Servers, Call Session Control Functions, and Border or Interconnect elements.

The trust level indicator in the SIP message may be used by a node in an IMS network to apply a security policy to any signalling associated with the SIP message. For example, a SIP message may be used to set up a media stream between two UEs, and a security policy may be applied to the media stream on the basis of the trust level indicator in the SIP message.

Figure 6:
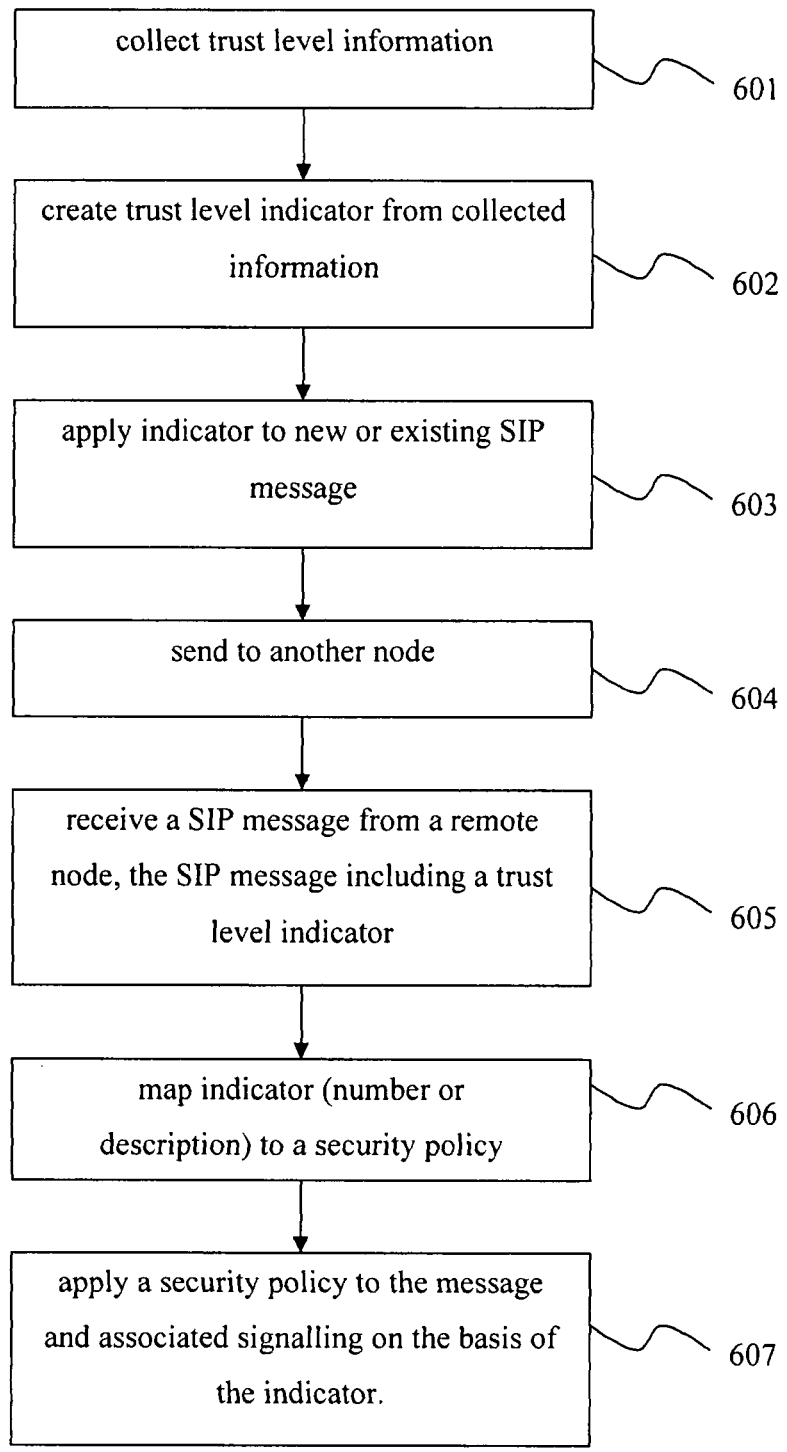
FIG. 6 is a flow diagram.

A flow diagram of the basic steps of an example embodiment is illustrated in FIG. 6. In order to create a trust level indicator, trust level information is collected 601 at a node. The node creates 602 a trust level indicator on the basis of the collected information. The trust level indicator is applied 603 to either a new SIP message or added to an existing SIP message, before the message is sent 604 to an IMS node. The IMS node receives 605 the SIP message from the node, which may be in a different network to the node. The SIP message contains the trust level indicator, and the IMS node maps 606 the indicator (which may be a number or a description, and may be made up of a plurality of trust level indicator elements) to a security policy. The security policy is then applied 607 to the message and associated signalling, the security policy being determined by the trust level indicator.

In some instances, IMS network operators have roaming and interconnect agreements with other IMS operators. In this is the case, an IMS operator agrees a trust level with another IMS operator, such that any traffic received from or via that operator would have at most the agreed trust level, or in other words a guarantee that a certain defined set of security mechanisms has been applied. In the case of roaming partners, for example where a P-CSCF is allocated to the user by the other operator, the other operator network may not support the same security mechanisms. Under these circumstances, when users are roaming they may be in a network that is accorded a lower trust level than their home network. Similarly, the user may be roaming in a visited network that accords the user's home network a low level of trust. In this case, either or both of the visited and home network may apply security policies to signalling passing between the visited and home networks. The additional information elements included in the trust level indicator by different network entities are used in the negotiation and enforcement of a correct trust level and a consistent security policy. There are several situations in which the trust level indicator may be used, and security policies enforced on the basis of the trust level indicator. Example of these are:

At Border or Interconnect elements, which enforce an operator-wide security policy, the trust level indicator is used to perform broad filtering of incoming traffic.

At Application Servers (AS), the trust level indicator is used to perform specific service behaviour (or disallow certain service behaviour). For example, if the Application Server considers that a message has a low trust level, a specific content filtering might be applied to see whether the message includes some viruses, spam etc. In addition, special premium services might be disabled (such as music download of DRM content) to ensure that such content is only sent to a "trusted" source. The AS may act on behalf of a user to do user based policing.

At end-user terminals, where the trust level indicator may be used to either perform specific treatment of incoming traffic, or inform the end user about the trust level of the incoming traffic. For example, an incoming call with a low trust level might be checked against a "spam" list or even be blocked if the user wishes to block such traffic completely.

Figure 7:
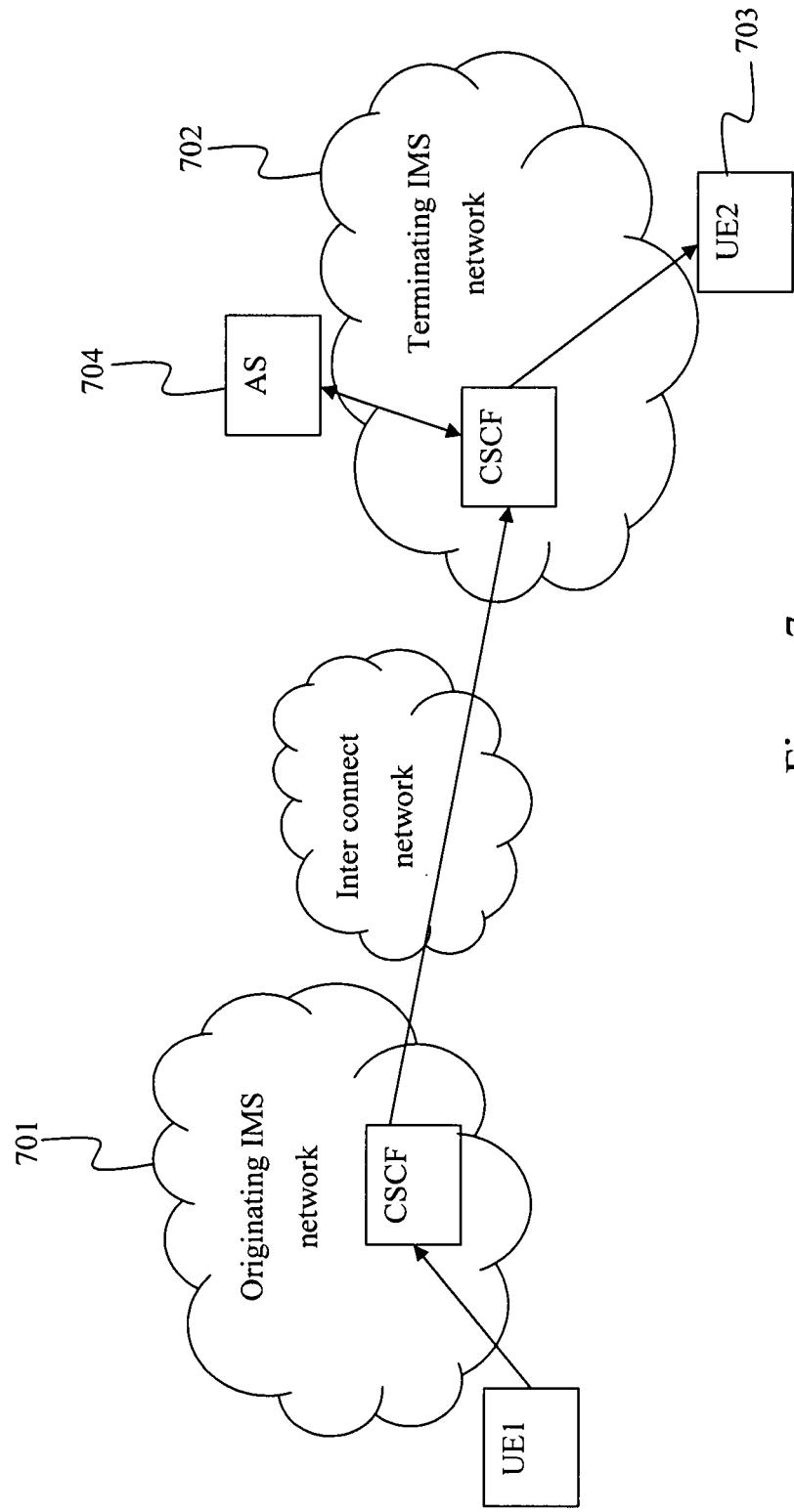
FIG. 7 illustrates schematically in a block diagram the routing of a SIP message between an originating IMS network and a terminating IMS network.

As illustrated in FIG. 7, when a SIP message traverse two domains, an "originating IMS network" 701 and a "terminating IMS network" 702, the routed to domain takes a static decision for all SIP requests received from a certain domain. If the trust level falls below a certain level, which has previously been negotiated and is defined in roaming and interconnect agreements, appropriate action is required. For a SIP message that doesn't have a sufficiently trusted trust level indicator, appropriate action may be the removal of the P-Asserted-Identity header, or topology hiding may be applied, or the SIP message may simply be disallowed. This requires that the border entities are provisioned with the agreements between the domains e.g. agreed when signing roaming and/or interconnect agreement between operators.

When a SIP request is authorized by the originating IMS network 701, the originating IMS network 701 adds a trust level indicator to the SIP request. When the SIP request is sent to another a terminating IMS network 702, the terminating IMS network 702 checks the trust level indicator and ensures that it is at the same or higher than the minimum trust level agreed between the two networks. A terminating IMS network border element may also add additional trust information, such as from which network it received the message. The SIP request is then routed towards User Equipment (UE) 703 and other entities (e.g. Application Servers, AS) 704 that use the trust level indictor to decide whether to trust the information included in the SIP request (e.g. the P-Asserted-Identity header).

If the originating IMS network 701 does not support the security mechanism indicated by the trust level indicator, the SIP request sent to the terminating IMS network 702 will not include any trust information. The terminating IMS network 702 then takes a static decision to which trust level the SIP request should be accorded based on the roaming or interconnect agreements with the originating IMS network.

Figure 8:
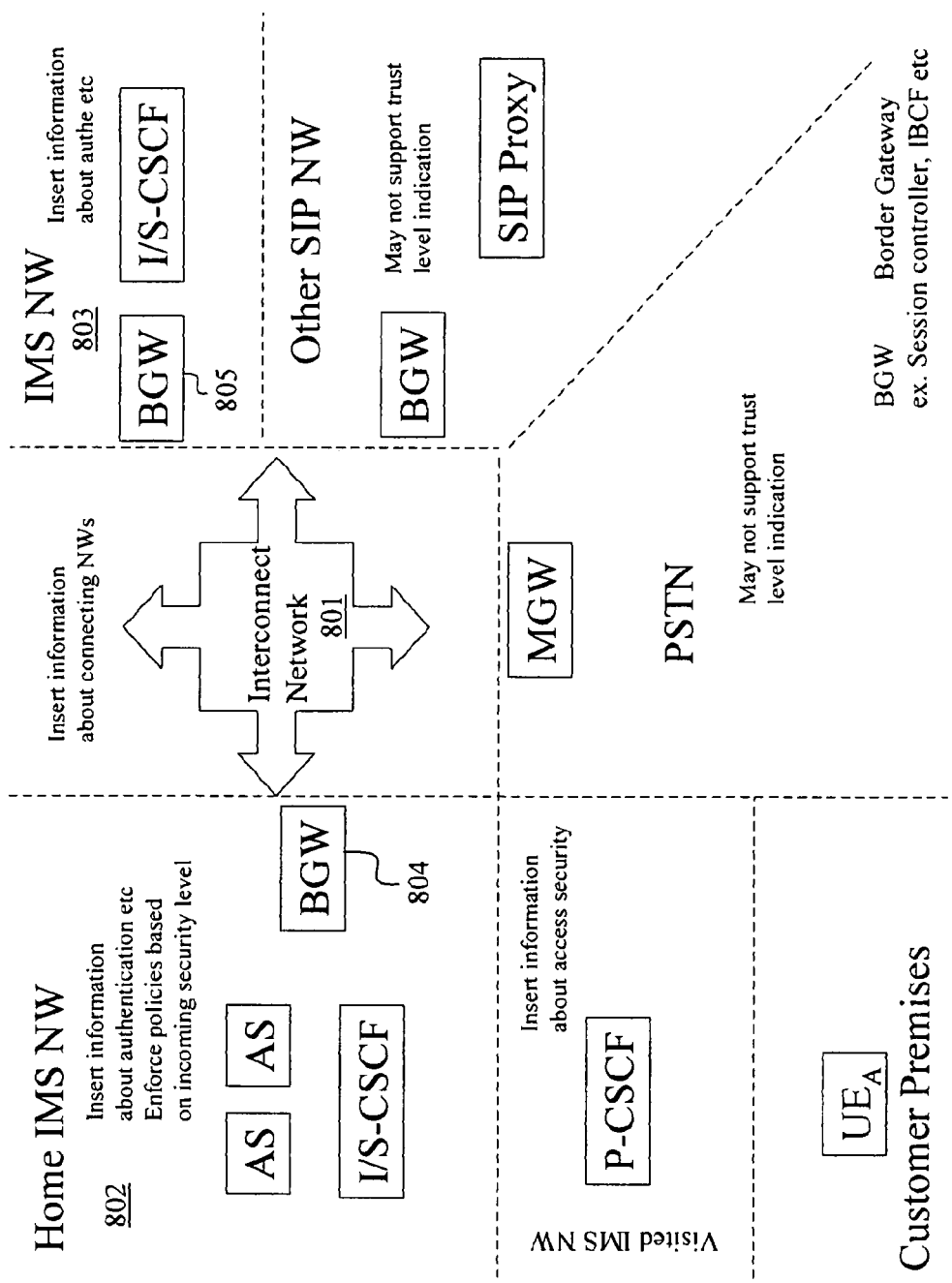
FIG. 8 illustrates schematically the functional divisions in interconnected networks according to an example embodiment.

A special interconnect network 801, as illustrated in FIG. 8, may be used between two or more operators to route traffic to the correct terminating network (this is often to avoid bi-lateral agreements between every operator in the world). For example the two operators may be the operator of the Home network 802 and a separate operator of another IMS network 803. In this case, it is beneficial for the different border elements 804, 805 to add an indication of the network from which the border element has received the message. By doing so, the border element 804, 805 of the terminating IMS network can then ensure that policies are used based on the trust information received, and which previous networks have been traversed by the message.

Application Servers can also make use of the trust level indicator. A special subscription for a service based on the trust level indicator can be applied, for example if a user only wishes to receive SIP messages that are accorded a certain level of trust. Such a service could be implemented in an AS. The AS can retrieve the subscription information from the HSS 205 (alternatively the trust level indicator is sent via the Ut interface from the UE) and if a SIP request has a lower trust level indicator than the trust level required by the user, the SIP request may be accorded special treatment, such as being ignored, logged, rejected, forwarded to voicemail etc.

One practical example where this can be used is in a service handling unsolicited communication (SPAM/SPIT filter), which then may apply different policies depending on the trust level indicator of the received SIP message. Examples of such policies are the following:

If the SIP message is received from an Internet interconnect, always apply strict filtering, only allowing incoming calls from user identities in a white list configured by the user, and also apply anti-malware detection on incoming traffic;

If the SIP message is received from an IMS network, using NBA or Digest authentication, apply anti-malware protection on incoming packets, and only allow a certain number of calls per minute;

If the SIP message is received from an IMS network, with IMS AKA usage and "trusted terminal", then do not apply any special security rule.

A UE can also make different use of the trust level indicator. Examples of such use include the following:

presenting the (derived) trust level (for the specific IMS communication) to the user, who then can decide whether to either take the call, or ask a number of questions to the remote user (to ensure the remote user is the "correct" user, which is may be used for incoming and outgoing calls);

if the application allows it, perform additional authentication;

perform a filter on the number of calls to present to the user, or to directly forward the call to e.g. voicemail.

If the UE is a gateway (such as a Home IMS Gateway, or a Residential Gateway, RGW, see, for example, ETSI TS 187 003) handling a number of devices, the trust level indicator can be used to decide which entity in the private network that should get the incoming request.

Currently there is a perception that the security and trust in IMS networks is homogeneous and completely bi-lateral and where a minimum security level is the least secure security mechanisms allowed in IMS networks. By introducing a trust level indicator into IMS networks, entities handling the IMS communication can be aware of the extent to which they can rely on information received in a SIP messages. This limits the risk of unsolicited communication; giving a higher probability that services requiring security architecture will adopt IMS because of its inbuilt security. This also ensures that the current bi-lateral security level (i.e., that two communicating parties must trust each other to the same level) can be avoided.

Although various embodiments have been shown and described in detail, the claims are not limited to any particular embodiment or example. None of the above description should be read as implying that any particular element, step, range, or function is essential such that it must be included in the claims' scope. The scope of patented subject matter is defined only by the claims. The extent of legal protection is defined by the words recited in the allowed claims and their equivalents.

The invention claimed is:

1. A method of handling trust in an IP Multimedia Subsystem network, the method comprising:
   at a node in the IP Multimedia Subsystem network, receiving a Session Initiation Protocol (SIP) message from a remote node, the SIP message including a standardized description of factors that affect a level of trust that is to be accorded to a communication sent from the remote node to the node;
   accessing a database to look up a security policy mapped to the standardized description of factors included in the SIP message, wherein the database maps each of a plurality of predetermined possible combinations of factors that affect the level of trust to a security policy; and
   applying the security policy to the SIP message,
   wherein the standardized description of factors that affect the level of trust is determined in accordance with information selected from any of user terminal type, encryption type, network type, node type, end user authentication mechanism, and intra-domain security mechanism, and
   wherein the security policy is selected from any of removing a P-Asserted Identity header, applying topology hiding, disallowing the communication, allowing the communication with no modification, filtering the SIP message in accordance with a database of allowable message sources, and applying malware detection on incoming signalling relating to the SIP message.

2. The method of handling trust in the IP Multimedia Subsystem network according to claim 1, where the remote node is disposed in another network.

3. The method of handling trust in the IP Multimedia Subsystem network according to claim 1, further comprising applying the security policy to all signalling associated with the SIP message.

4. The method of handling trust in the IP Multimedia Subsystem network according to claim 1, the method further comprising mapping the standardized description of factors to the security policy.

5. The method of handling trust in the IP Multimedia Subsystem network according to claim 4, wherein the standardized description of factors that affect the level of trust comprises a plurality of indicator elements, each indicator element relating to a level of trust of a different node in a signalling path between the remote node and the node.

6. The method of handling trust in the IP Multimedia Subsystem network according to claim 4, wherein the standardized description of factors that affect the level of trust comprises a plurality of indicator elements, each indicator element relating to a level of trust of a different node in a signalling path between the remote node and the node, and at least one of the indicator elements comprising an indication of a network from which the SIP message was received.

7. The method of handling trust in the IP Multimedia Subsystem network according to claim 1, wherein the security policy is applied at one of a border element, an Application Server, User Equipment, and a Call Session Control Function.

8. A node for use in an IP Multimedia subsystem network, the node comprising:
   a receiver configured to receive a Session Initiation Protocol (SIP) message from a remote node, the SIP message including a standardized description of factors that affect a level of trust that is to be accorded to a communication sent from the remote node to the node; and
   a processor configured to:
      access a database to look up a security policy mapped to the standardized description of factors included in the SIP message, wherein the database maps each of a plurality of predetermined possible combinations of factors that affect the level of trust to a security policy; and
      apply the security policy to the SIP message,
   wherein the standardized description of factors that affect the level of trust is determined in accordance with information selected from any of user terminal type, encryption type, network type, node type, end user authentication mechanism, and intra-domain security mechanism, and wherein the security policy is selected from any of removing a P-Asserted Identity header, applying topology hiding, disallowing the communication, allowing the communication with no modification, filtering the SIP message in accordance with a database of allowable message sources, and applying malware detection on incoming signalling relating to the SIP message.

9. The node according to claim 8, wherein the node is selected from one of User Equipment, a Call Session Control Function, a border element, and an Application Server.

10. A node for use in a communications network, the node comprising:

a processor configured to collect trust level information relating to factors that affect a level of trust that is to be accorded to a communication sent from the node, the processor being further configured to:

generate a standardized description of factors that affect the level of trust, the standardized description of factors being one of a plurality of predetermined possible combinations of factors that affect the level of trust and mapped to a security policy; and modify a Session Initiation Protocol message such that the Session Initiation Protocol message includes the standardized description of factors that affect the level of trust; and a transmitter configured to send the Session Initiation Protocol message, wherein the standardized description of factors that affect the level of trust is determined in accordance with information selected from any of user terminal type, encryption type, network type, node type, end user authentication mechanism, and intra-domain security mechanism, and wherein the security policy is selected from any of removing a P-Asserted Identity header, applying topology hiding, disallowing the communication, allowing the communication with no modification, filtering the SIP message in accordance with a database of allowable message sources, and applying malware detection on incoming signalling relating to the SIP message.

11. The node according to claim 10, wherein the processor is arranged to modify an existing standardized description of factors that affect the level of trust in a Session Initiation Protocol message by adding a trust level indicator element to the existing standardized description of factors that affect the level of trust, the trust level indicator element relating to a trust level of the node or a network in which the node is disposed.

12. The node according to claim 10, wherein the node is selected from one of User Equipment, a Call Session Control Function, a border element, and an Application Server.

13. A method of handling trust in an IP Multimedia Subsystem network, the method comprising:

at a node, collecting trust level information relating to factors that affect a level of trust that is to be accorded to a communication sent from the node;

from the trust level information, creating a standardized description of factors that affect the level of trust, the standardized description of factors being one of a plurality of predetermined possible combinations of factors that affect the level of trust and mapped to a security policy; and adding the standardized description of factors that affect the level of trust to a Session Initiation Protocol message, wherein the trust level information is based on any of database information, user terminal type, encryption type, network type, node type, end user authentication mechanism, and intra-domain security mechanism wherein the security policy is selected from any of removing a P-Asserted Identity header, applying topology hiding, disallowing the communication, allowing the communication with no modification, filtering the SIP message in accordance with a database of allowable message sources, and applying malware detection on incoming signalling relating to the SIP message.

14. The method of handling trust in the IP Multimedia Subsystem network according to claim 13, wherein the standardized description of factors that affect the level of trust is added to one of a new Session Initiation Protocol created by the network node and an existing Session Initiation Protocol received by the network node.

* * * * *